US 9,396,396 B2

(12) United States Patent
Hasegawa et al.

(10) Patent No.: US 9,396,396 B2
(45) Date of Patent: Jul. 19, 2016

(54) FEATURE VALUE EXTRACTION APPARATUS AND PLACE ESTIMATION APPARATUS

(71) Applicant: Tokyo Institute of Technology, Meguro-ku Tokyo (JP)

(72) Inventors: Osamu Hasegawa, Meguro-ku Tokyo (JP); Gangchen Hua, Meguro-ku Tokyo (JP)

(73) Assignee: SOINN HOLDINGS LLC, Tokyo (JP)

( * ) Notice: Subject to any disclaimer, the term of this patent is extended or adjusted under 35 U.S.C. 154(b) by 0 days.

(21) Appl. No.: 14/440,768

(22) PCT Filed: Nov. 6, 2013

(86) PCT No.: PCT/JP2013/006550
§ 371 (c)(1),
(2) Date: May 5, 2015

(87) PCT Pub. No.: WO2014/073204
PCT Pub. Date: May 15, 2014

(65) Prior Publication Data
US 2015/0294157 A1    Oct. 15, 2015

(30) Foreign Application Priority Data

Nov. 6, 2012  (JP) ................................. 2012-244540

(51) Int. Cl.
| | |
|---|---|
| *G06K 9/00* | (2006.01) |
| *G01B 11/00* | (2006.01) |
| *G06T 7/20* | (2006.01) |
| *G06K 9/46* | (2006.01) |
| *G06K 9/62* | (2006.01) |

(52) U.S. Cl.
CPC ............ *G06K 9/00691* (2013.01); *G01B 11/00* (2013.01); *G06K 9/00704* (2013.01);
(Continued)

(58) Field of Classification Search
None
See application file for complete search history.

(56) References Cited

U.S. PATENT DOCUMENTS

| | | | | |
|---|---|---|---|---|
| 2001/0055063 | A1* | 12/2001 | Nagai ................... | G01S 11/12 348/116 |
| 2010/0114374 | A1* | 5/2010 | Cho .................. | G06K 9/00201 700/259 |

(Continued)

FOREIGN PATENT DOCUMENTS

| | | |
|---|---|---|
| JP | 2010-238008 | 10/2010 |
| JP | 2011-053823 | 3/2011 |

(Continued)

OTHER PUBLICATIONS

Tongprasit, N., et al.: "PIRF-Nav 2: Speeded-Up Online and Incremental Appearance-Based SLAM in an Indoor Environment," IEEE Workshop on Applications of Computer Vision (WACV), 2011.

*Primary Examiner* — Stephen R Koziol
*Assistant Examiner* — David Perlman
(74) *Attorney, Agent, or Firm* — Fanelli Haag PLLC

(57) ABSTRACT

A place estimation apparatus performs a place estimation process by using position-invariant feature values extracted by a feature value extraction unit. The feature value extraction unit includes local feature value extraction unit that extracts local feature values from each of input images formed from successively-shot successive images, feature value matching unit that obtains matching between successive input images based on the extracted local feature values, corresponding feature value selection unit that selects matched feature values as corresponding feature values, and position-invariant feature value extraction unit that obtains position-invariant feature values based on the corresponding feature values. The position-invariant feature value extraction unit extracts, from among the corresponding feature values, corresponding feature values whose position change is equal to or less than a predetermined threshold as the position-invariant feature values.

12 Claims, 16 Drawing Sheets

(52) U.S. Cl.
CPC ............ *G06K9/4671* (2013.01); *G06K 9/6211* (2013.01); *G06T 7/2033* (2013.01); *G06K 2209/29* (2013.01); *G06T 2207/10016* (2013.01)

(56) References Cited

U.S. PATENT DOCUMENTS

2013/0108172 A1  5/2013  Tongprasit et al.

2015/0161147 A1*  6/2015  Zhao .................... G06F 17/3079
707/772

FOREIGN PATENT DOCUMENTS

| JP | 2011/215716 | 10/2011 |
| WO | WO 2011/145239 | 11/2011 |

\* cited by examiner

```
Algorithm1:Incremental Center of Gravity Matching's Algorithm
Input:Match feature points between I_0 and I_1 :
    P = (p_0, p_1, ... p_n), P' = (p'_0, p'_1, ... p'_n) and ICGM's
    matching threshold Thr
Output:Robust feature points' set on I_0 and I_1 : P_R, P'_R
```

$CG0, CG1, CGV_0, CGV_1 = \begin{bmatrix} 0 \\ 0 \end{bmatrix};$ $P_R, P'_R = \Phi$ $GetGoodSet = false$ $S_{CG} = 0;$

```
/* Get initial two robust feature points           */
while GetGoodSet is false do
    i, j = 0;
    while i == j do
        i ← random int between 0 and n;
        j ← random int between 0 and n;
    end
```
$CGV_0 \leftarrow p_i - p_j;$
$CGV_1 \leftarrow p'_i - p'_j;$
if $\|CGV_0 - CGV_1\| <= Thr$ then
    $GetGoodSet \leftarrow true;$
    $CG0 \leftarrow \frac{1}{2}(p_i + p_j);$
    $CG1 \leftarrow \frac{1}{2}(p'_i + p'_j);$
    $S_{CG} \leftarrow 2;$
    delete $P_i, P_j$ from p;
    delete $P'_i, P'_j$ from p';
```
    end
end
/* Test remaining feature points in p and p'        */
for k = 0; k ≤ n-2; k ≠ i do
```
    $CGV_0 \leftarrow CG0 - p_k;$
    $CGV_1 \leftarrow CG1 - p'_k;$
    if $\|CGV_0 - CGV_1\| <= Thr$ then
        $CG0 \leftarrow \frac{S_{CG}}{S_{CG}+1}(CG0 + \frac{1}{S_{CG}}p_k);$
        $CG1 \leftarrow \frac{S_{CG}}{S_{CG}+1}(CG1 + \frac{1}{S_{CG}}p'_k);$
        $S_{CG} \leftarrow S_{CG} + 1$
        append $P_k$ to $P_R;$
        append $P'_k$ to $P'_R;$
```
    end
end
return P_R, P'_R;
```

Fig. 4

TABLE I

RESULT OF EXPERIMENT C

| | Recall | Precision | Total Processing Time (second) |
|---|---|---|---|
| Proposed method (non-real-time) | 96.1% | 97.5% | 204.25 |
| Proposed method (real-time) | 86.1% | 95.2% | 196.51 |
| FAB-MAP [2] | 38.8% | 95.4% | 155.6 |
| PIRF-nav2.0 [6] | 86.2% | 78.8% | 182.4 |

Fig. 14 image i          image j $$D_i(\omega_a, \omega_b, ..., \omega_n) \qquad D_j'(\omega'_a, ..., \omega'_b, ..., \omega'_n)$$

$$s \longrightarrow k$$

$$\textit{offset}_x = |k-s|$$

$$\frac{S_{aob}}{S_{abcd}} = \frac{S_{a'o'b'}}{S_{a'b'c'd'}}$$

Algorithm2: Obtaining credible $o$ and $o'$

Input: $W$, $W'$ /* already processed by order constraint */

Output: $o$, $o'$, $S_\pi$, $S'_\pi$, $W_{tmp}$, $W'_{tmp}$

Step1: $W_{tmp} = W$, $W'_{tmp} = W'$

Build $o$, $o'$, $S_\pi$, $S'_\pi$ with $W_{tmp}$, $W'_{tmp}$ $SizePrevious = sizeof(W_{tmp})$

Step2: for_each($W_{tmp}$, $W'_{tmp}$)

{

Calculate $AveDev^i_\omega$ if( $AveDev^i_\omega > T_{dc}$) Remove $w_i$, $w'_i$ from $W_{tmp}$, $W'_{tmp}$

} if($sizeof(W_{tmp}) == SizePrevious$)

terminate else

Goto Step1

Fig. 18

Algorithm3: Using credible o and o' to try to establish a larger affine-invariant hypothesis

Input: $W$, $W'$, $W_{tmp}$, $W'_{tmp}$

Output: $W_{AC}$, $W'_{AC}$

Step1: Build o, o', $S_o$, $S'_o$ with $W_{tmp}$, $W'_{tmp}$ $SizePrevious = sizeof(W_{tmp})$

Step2: for_each($W$, $W'$)

{ if($w_i$ and $w'_i$ is not belong to $W_{tmp}$ and $W'_{tmp}$) Calculate $AveDev^i_o$ if($AveDev^i_o < T_{AC}$) Insert $w_i$, $w'_i$ into $W_{tmp}$, $W'_{tmp}$

} if($sizeof(W_{tmp}) == SizePrevious$)

$W_{AC} = W_{tmp}$, $W'_{AC} = W'_{tmp}$ terminate else

Goto Step1

Fig. 19

FEATURE VALUE EXTRACTION APPARATUS AND PLACE ESTIMATION APPARATUS

This application is a U.S. National Stage application of PCT International Application No. PCT/JP2013/006550, which was filed Nov. 6, 2013, which claims priority to Japanese Patent Application No. 2012-244540, which was filed on Nov. 6, 2012, the disclosures of each of which is incorporated herein by reference in its entirety.

TECHNICAL FIELD

The present invention relates to a feature value extraction apparatus, a method, and a program for extracting local feature values from an input image, and a place estimation apparatus, a method, and a program using them.

BACKGROUND ART

Estimating/specifying one's own position (place) in an environment is an ability indispensable for a person or a machine. It is always important for a robot or a computer vision to recognise where it is located. In particular, in the case of a movable robot, recognizing where the robot itself is located is a fundamental requirement of its navigation system.

For such place identification, how accurately feature values of a surrounding environment are extracted is a key point. As conventional techniques for extracting local feature values from environments, there are affine-invariant feature values (MSER, Harris-Affine, Hessian-Affine, Salient Region, and so on), and feature values that are invariant to size changes (SIFT: Scale Invariant Feature Transformation, SURF: Speed Up Robustness Features, and so on). Further, as feature values that are obtained by extracting only feature values robust against changes in shooting positions from local feature values extracted from each of successive images by the above-described techniques, there are PIRF (Position-invariant Robust Features) (Patent Literatures 1 to 3, and Non-patent Literature 1).

CITATION LIST

Patent Literature

Patent Literature 1: Japanese Unexamined Patent Application Publication No. 2011-053823
Patent Literature 2: Japanese Unexamined Patent Application Publication No. 2011-215716
Patent Literature 3: Japanese Patent Application No. 2010-11530

Non Patent Literature

Non-patent Literature 1: N. Tongpraslt, A. Kawewong, O. Hasegawa, "Pirf-nav 2: speededup online and incremental appearance-based slam in highly dynamic environment", IEEE Workshop on Applications of Computer Vision (WACV), 2011.

SUMMARY OF INVENTION

Technical Problem

However, there is the following problem in the PIRF. In the PIRF, local feature values (hereinafter, also referred to simply as "feature values" or "feature points") that appear in images of several successive frames are extracted as invariant feature values. However, when doing so, local feature values that successively appear in the temporal direction are all regarded as invariant feature values and hence extracted irrespective of whether they are local feature values whose spatial positions are unchanged or local feature values whose positions are changing. That is, local feature values whose positions are unchanged and kinetic local feature values whose positions change are not separated from each other and are instead equivalently handled as invariant feature values.

Therefore, in place estimation using invariant feature values extracted by the PIRF, local feature values of kinetic objects, such as moving people, that are essentially unsuitable for the place estimation are also used, thus giving adverse effects to the estimation accuracy and the calculation speed.

The present invention has been made to solve the above-described problem and an object thereof is to provide a feature value extraction apparatus, a method, and a program capable of extracting local feature values whose positions are unchanged, and a place estimation apparatus, a method, and a program equipped with them.

Solution to Problem

A place estimation apparatus according to the present invention includes: feature value extraction means for extracting a position-invariant feature value from an input image; matching means for referring to a database and obtaining matching between the input image and a registered place, the database storing each registered place and its associated position-invariant feature value; similarity-level calculation means for calculating a similarity level in which a registered place near a selected registered place is included in the calculation when the matching is equal to or higher than a predetermined threshold; and place recognition means for recognizing that the input image is the registered place when the similarity level is equal to or higher than a predetermined threshold, in which the feature value extraction means includes: local feature value extraction means for extracting a local feature value from each of input images formed from successively-shot successive images; feature value matching means for obtaining matching between successive input images for the local feature value extracted by the local feature value extraction means; corresponding feature value selection means for selecting a feature value, for which the matching is obtained between the successive images by the feature value matching means, as a corresponding feature value; and position-invariant feature value extraction means for obtaining a position-invariant feature value based on the corresponding feature value, and the position-invariant feature value extraction means extracts, from among the corresponding feature values, a corresponding feature value whose position change is equal to or less than a predetermined threshold as the position-invariant feature value.

A place estimation method according to the present invention includes: a feature value extraction step for extracting an invariant feature value from an input image; a matching step for referring to a database and obtaining matching between the input image and a registered place, the database storing each registered place and an invariant feature value while associating them with each other; a similarity-level calculation step for calculating a similarity level in which a registered place near a selected registered place is included in the calculation when the matching is equal to or higher than a predetermined threshold; and a place recognition step for recognizing that the input image is the registered place when the similarity level is equal to or higher than a predetermined threshold, in which the feature value extraction step includes: a local feature value extraction step for extracting a local feature value from each of input images formed from successively-shot successive images; a feature value matching step for obtaining matching between successive input images for the local feature value extracted in the local feature value extraction step; a corresponding feature value selection step for selecting a feature value, for which the matching is obtained between the successive images in the feature value matching step, as a corresponding feature value; and position-invariant feature value extraction step for obtaining a position-Invariant feature value based on the corresponding feature value, and in the position-invariant feature value extraction step, a corresponding feature value whose position change is equal to or less than a predetermined threshold is extracted from among the corresponding feature values as the position-invariant feature value.

A feature value extraction apparatus according to the present invention includes: local feature value extraction means for extracting a local feature value from each of input images formed from successively-shot successive images; feature value matching means for obtaining matching between successive input images for the local feature value extracted by the local feature value extraction means; corresponding feature value selection means for selecting a feature value, for which the matching is obtained between the successive images by the feature value matching means, as a corresponding feature value; and position-invariant feature value extraction means for obtaining a position-invariant feature value based on the corresponding feature value, and the position-invariant feature value extraction means extracts, from among the corresponding feature values, a corresponding feature value whose position change is equal to or less than a predetermined threshold as the position-Invariant feature value.

A feature value extraction method according to the present invention includes: a local feature value extraction step for extracting a local feature value from each of input images formed from successively-shot successive images; a feature value matching step for obtaining matching between successive input images for the local feature value extracted in the local feature value extraction step; a corresponding feature value selection step for selecting a feature value, for which the matching is obtained between the successive images in the feature value matching step, as a corresponding feature value; and position-invariant feature value extraction step for obtaining a position-invariant feature value based on the corresponding feature value, and in the position-invariant feature value extraction step, a corresponding feature value whose position change is equal to or less than a predetermined threshold is extracted from among the corresponding feature values as the position-invariant feature value.

A program according to the present invention is a program for causing a computer to execute the above-described place estimation method or the feature value extraction method.

Advantageous Effects of Invention

According to the present invention, it is possible to provide a feature value extraction apparatus, a method, and a program capable of extracting local feature values whose positions are unchanged as robust feature values, and a place estimation apparatus, a method, and a program using them.

BRIEF DESCRIPTION OF DRAWINGS

FIG. 4 is a list showing a position-invariant feature value extraction process;

FIG. 14 shows a result of the Minamidai outdoor experiment;

FIG. 18 is a list of a position-invariant feature value extraction process; and

FIG. 19 is a list of a position-invariant feature value extraction process.

DESCRIPTION OF EMBODIMENTS

In exemplary embodiments, a technique in which feature values whose positions are unchanged over a long period in an environment, i.e., position-invariant feature values are extracted and they are used for place estimation is disclosed. There are static local feature values, i.e., feature values whose positions are unchanged over a long period in an environment. For example, there are a number of pedestrians in a train station. However, since the positions of feature values of these pedestrians usually change in a short time, they are not regarded as static feature values. In contrast to this, the positions of feature values related to elements such as walls and signboards do not change over a long period. It is desirable to use such position-invariant feature values for place estimation.

Specific exemplary embodiments to which the present invention is applied are explained hereinafter in detail with reference to the drawings, in these exemplary embodiments, the present invention is applied to a place estimation apparatus for estimating a place that is incorporated into a moving-type robot apparatus or the like.

<First Exemplary Embodiment of the Present Invention>

Figure 1:
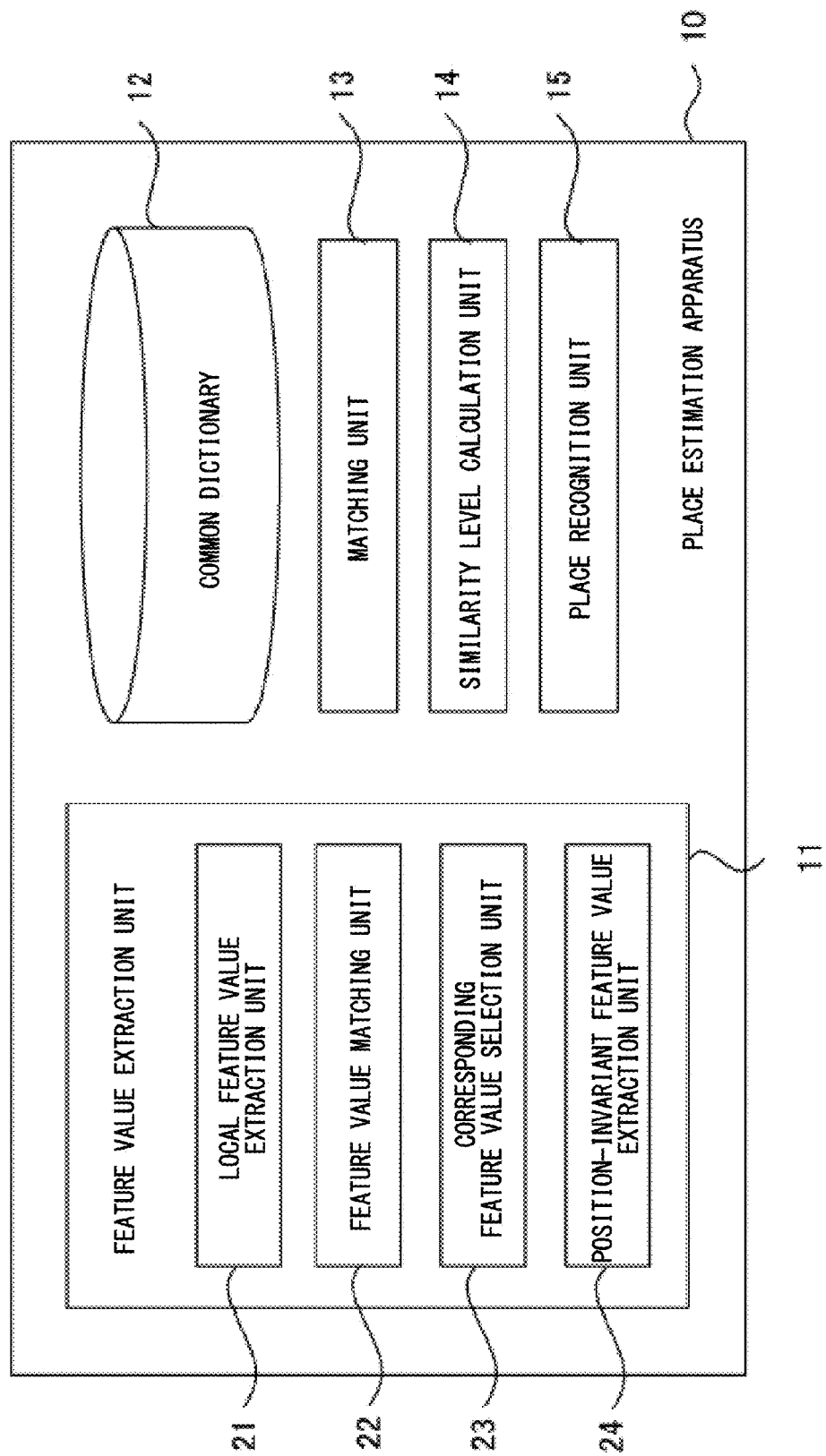
FIG. 1 is a block diagram showing a place estimation apparatus according to an exemplary embodiment of the present invention.

FIG. 1 is a block diagram showing a place estimation apparatus according to an exemplary embodiment of the present invention. The place estimation apparatus 10 includes a feature value extraction unit 11 that extracts position-invariant feature values from input images consisting of successively-shot successive images, a common dictionary 12, a matching unit 13, a similarity-level calculation unit 14, and a place recognition unit 15. Further, the feature value extraction unit 11 includes a local feature value extraction unit 21, a feature value matching unit 22, a corresponding feature value selection unit 23, and a position-invariant feature value extraction unit 24.

The local feature value extraction unit 21 extracts local feature values from each of the input images. The feature value matching unit 22 obtains matching between successive input images for the local feature values extracted by the local feature value extraction unit 21. The corresponding feature value selection unit 23 extracts feature values for which matching between the successive images has been obtained by the feature value matching unit as corresponding feature values. It is assumed in this exemplary embodiment that the feature value matching unit 22 and the corresponding feature value selection unit 23 obtain corresponding feature values by using two successive images. Examples of the technique for extracting corresponding feature values include a SIFT (Scale Invariant Feature Transformation) and SURF (Speed Up Robustness Features).

The position-invariant feature value extraction unit 24, which is a processing unit that carries out a characteristic process of the present invention, extracts, from among the corresponding feature values extracted by the corresponding feature value selection unit 23, only the feature values whose positions are unchanged (position-invariant feature values). Hereinafter, this technique for extracting position-invariant feature values is referred to as "ICGM (Incremental Center of Gravity Matching)"

The matching unit 13 refers to a database in which places and their position-invariant feature values are registered in a state where the places are associated with their respective position-invariant feature values, performs matching between an input image and a registered place, and calculates a matching score. The similarity-level calculation unit 14 calculates a similarity level in which a registered place(s) near the selected registered place is included in the calculation when the matching score is equal or higher than a predetermined threshold. The place recognition unit 15 recognizes that the input image is an image of the registered place when the similarity level is a predetermined threshold.

Figure 2:
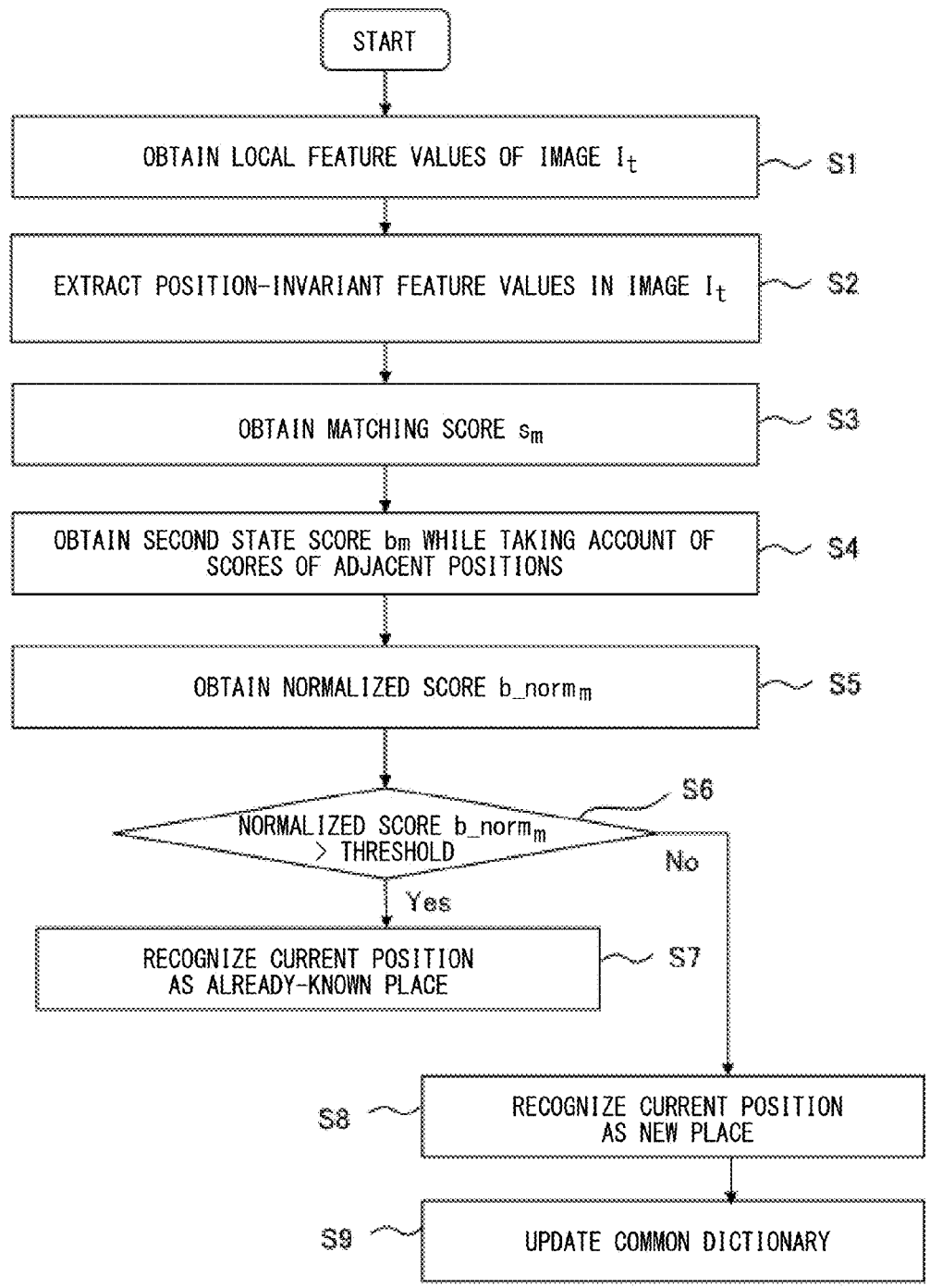
FIG. 2 is a flowchart showing a place estimation method according to an exemplary embodiment of the present invention.

Next, a place estimation method using the place estimation apparatus 10 according to this exemplary embodiment is explained. FIG. 2 is a flowchart showing a place estimation method according to this exemplary embodiment.
(Extraction of Position-Invariant Feature Values)

Firstly, a process in which the feature value extraction unit 11 extracts position-invariant feature values from an input image $I_t$ is explained.

As input images, two successively-shot images $I_t$ and $I_{t-1}$ are input to the local feature value extraction unit 21. Note that successive images required in the ICGM are, for example, images that are successively shot at a predetermined frame rate (e.g., two frames per second). In general, images captured from video images are successive images. Therefore, video images are preferably used as input images in the ICGM.

Firstly, the local feature value extraction unit 21 extracts local feature values by using an existing local feature value extraction method (step S1). For example, the local feature value extraction unit 21 can use a feature value extraction method such as a SIFT (Scale Invariant Feature Transformation) or SURF (Speed Up Robustness Features). However, needless to say, local feature values other than the SIFT and the SURF can also be used. In particular, other local feature values that are robust against scaling, rotations variations, noises, or the like are preferably used. By using these local feature values, properties of existing feature values are taken over as they are, thus making it possible to extract/describe as features robust against illumination changes and the like.

It is assumed that the SURF is used in this exemplary embodiment. In the SIFT, 2,000 to 3,000 feature values or larger are extracted as local feature values. In contrast to this, since 200 to 300 local feature values are extracted in the SURF, the calculation amount is small.

The feature value matching unit 22 uses an image $I_t$ acquired at the current time t and an image it−1 acquired at the immediately-preceding time t−1, and performs matching between these successive images for local feature values. Note that the matching can be carried out by using various publicly-know techniques used in, for example, the SIFT (Scale Invariant Feature Transformation) or the SURF (Speed Up Robustness Features). For example, a matching score is calculated by using feature values extracted from respective images. Then, when the matching score is equal to or higher than a predetermined threshold, both local feature values are considered to be matched with each other.

The corresponding feature value selection unit 23 selects feature values for which the feature value matching unit 22 has determined that matching between the successive images has been obtained as corresponding feature values. Further, the corresponding feature value selection unit 23 generates a set "$p=(p_0, p_1, \ldots, p_n)$" of the local feature values in the image $I_t$ at the current time t and a set "$p'=(p'_0, p'_1, \ldots, p'_n)$" of the local feature values in the image $I_{t-1}$ at the time t−1.

Figure 3:
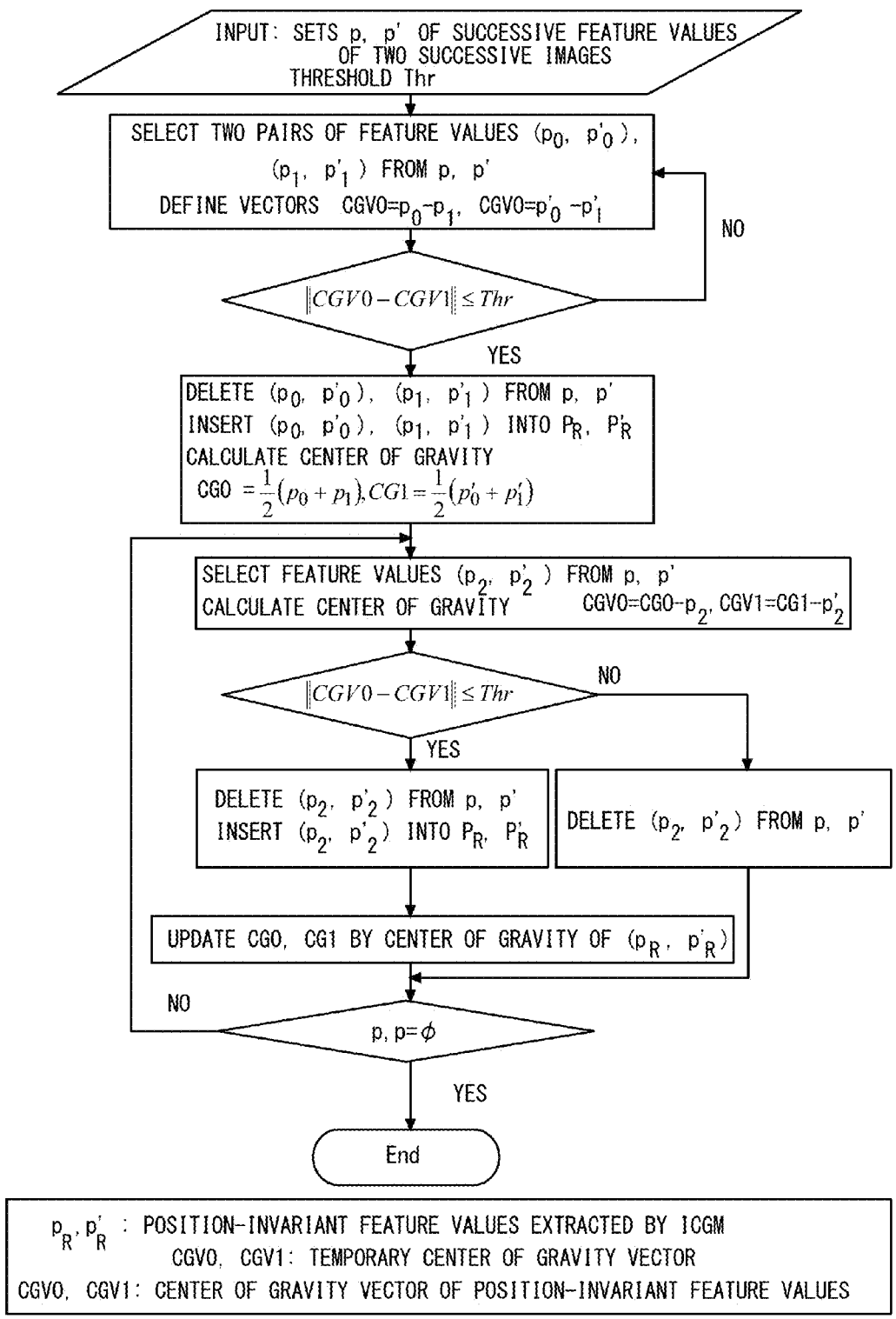
FIG. 3 is a flowchart showing a position-invariant feature value extraction process.

Next, the position-invariant feature value extraction unit 24 extracts position-invariant feature values in the image $I_t$ at the current time t by using the sets p and p' of the corresponding feature values (step S2). The algorithm of this position-Invariant feature value extraction process is shown in a flowchart shown in FIG. 3 and a list shown in FIG. 4. This algorithm is explained hereinafter with reference to the flowchart shown in FIG. 3.

Step 1: Two pairs of corresponding local feature values are selected from two successive images. That is, two local feature values $p_0$ and $p_1$ are selected from the set p of the corresponding feature values in the image $I_t$. Further, local feature values $p'_0$ and $p'_1$ are selected from the set p' of the corresponding feature values in the image $I_{t-1}$. Note that each of the feature values $p_0$ and $p_1$ and the feature values $p'_0$ and $p'_1$ is a pair of feature values that are determined to be matched with each other by the feature value matching unit 22.

Step 2: A vector is calculated based on the selected two points in each of the images. That is, a vector "$CGV0=p_0-p_1$" is obtained in the image $I_t$ and a vector "$CGV1=p'_0-p'_1$" is obtained in the image $I_{t-1}$.

Step 3: The vectors CGV0 and CGV1 are compared to each other. Then, if they are not similar to each other, the process returns to the step 1. On the other hand, if they are similar to each other, the local feature values $p_0$ and $p_1$ are recognized as position-invariant feature values. That is, if the difference between the two vectors is equal to or smaller than a predetermined threshold, i.e., if $\|CGV0-CGV1\|<=Thr$, the two vectors are similar to each other. Therefore, the positions of the local feature values pi and pj, and pi' and pj' are unchanged. If $\|CGV0-CGV1\|>Thr$, the process returns to the step 1. Note that the fact that the two vectors are similar to each other means that the geometrical positional relation between the local feature values $p_0$ and $p_1$, and $p'_0$ and $p'_1$ are substantially unchanged between the two images. That is, it means that the positions of the feature points $p_0$ and $p_1$ can be considered to be unchanged.

Step 4: The feature values $p_0$ and $p_1$ extracted from the image $I_t$ are removed from the set p and stored in a variable $P_R$. Similarly, the feature values $p'_0$ and $p'_1$ extracted from the image $I_{t-1}$ are removed from the set p' and stored in a variable $P'_R$. Further, the centers of gravity CG0 and CG1 of the selected two points are calculated by Expression (1) in the respective images.

$$CG0=(p_0+p_1)/2, CG1=(p'_0+p'_1)/2 \quad (1)$$

Step 5: After that, tests for determining whether the positions of the remaining corresponding feature values in the images $I_t$ and $I_{t-1}$ are unchanged or not are successively performed therefor. Firstly, a pairs of corresponding feature values $p_2$ and $p_2$ is selected from the images $I_t$ and $I_{t-1}$. This selection can be performed, for example, in the order of the index. Next, vectors are calculated based on the centers of gravity CG0 and CG1 calculated in the step 4 and the selected local feature values $p_2$ and $p'_2$ in the respective images. That is, a vector "CGV0=CG0−$p_2$" is obtained in the image $I_t$ and a vector "CGV1=CG1−$p'_2$" is obtained in the image $I_{t-1}$.

Step 6: These vectors are compared to each other. Then, if they are similar to each other, the selected local feature values are recognized as position-invariant feature values. That is, if the difference between the two vectors is equal to or smaller than the threshold Thr, i.e., If $\|CGV0-CGV1\| \leq Thr$, the two vectors are similar to each other. Therefore, the positions of the local feature values $p_2$ and $p'_2$ are unchanged. Note that the fact that the two vectors are similar to each other means that the geometrical positional relations between the center of gravity CG0 and the local feature value $p_2$, and between the center of gravity CG1 and the local feature value $p'_2$ are substantially unchanged between the two images. That is, this fact means that the position of the feature point $p_2$ can be considered to be unchanged.

Step 7: The feature value $p_2$ extracted from the image $I_t$ is removed from the set p and stored in the variable $P_R$. Similarly, the feature value $p'_2$ extracted from the image $I_{t-1}$ is removed from the set p' and stored in the variable $P'_R$. Further, the center of gravity between the center of gravity CG0 and the feature value $p_2$ and that between the center of gravity CG1 and the feature value $p'_2$ are calculated in the respective images, and the calculated centers of gravity are used as new centers of gravity CG0 and CG1.

Step 8: On the other hand, if $\|CGV0-CGV1\| > Thr$, it means that the positions of the feature values $p_2$ and $p'_2$ are changed. Therefore, the feature values $p_2$ and $p'_2$ should be excluded from the feature values to be extracted. Accordingly, the feature values $p_2$ and $p'_2$ are removed from the sets p and p', respectively.

Step 9: When the tests for all the local feature values included in the sets p and p' have been finished, that is, when the sets p and p' become empty sets, the process is finished. The local feature values included in the variable $P_R$ at this point are position-invariant feature values. Then, the position-invariant feature value extraction process is finished.

(Place Estimation Using Position-Invariant Feature Value)

After the position-invariant feature values are extracted, the matching unit 13 obtains matching scores $s_m$ by referring to the common dictionary 12 (step S3). The common dictionary 12 holds models m, m+1, m+2, . . . , which are sets of feature values of respective places $L_m, L_{m+1}, L_{m+2}, \ldots$ that are successively located in an environment. A matching score $s_m$ between an image $I_t$ and a model m for a place $L_m$ is obtained by Expression (2).

$$s_m = n_m \times num\_appear \quad (2)$$

In the expression, $s_m$ represents a matching score between the model m, which is a set of feature values of the place $L_m$, and a set $P_R$ of the position-invariant feature values in the image $I_t$. The variable num_appear represents the number of position-invariant feature values that are matched in the common dictionary 12. For example, when three position-invariant feature values are matched, the variable num_appear becomes three (num_appear=3). The variable $n_m$ represents the number of position-invariant feature values that are matched with those of the model m. For example, if $n_m=2$, the matching score $s_m$ becomes six ($s_m=2\times3=6$).

Next, the similarity-level calculation unit 14 obtains a second state score (first estimated value) $b_m$ by taking account of adjacent places (step S4). There is a high possibility that a feature that appears in the place $L_m$ also appears in adjacent places $L_{m-2}, L_{m-1}, L_{m+1}$ and $L_{m+2}$. That is, it is predicted that the matching score of each of these adjacent places is roughly equal to or slightly lower than the matching score $s_m$. That is, for example, when a matching score $s_{m-1}$ or $s_{m+1}$ is zero even though the matching score $s_m$ is high, it means that the value of the matching score $s_m$ is incorrect i.e., the place estimation has not been correctly performed. Note that in this exemplary embodiment, a second state score $b_m$ that is weighted by a Gaussian function $p_t(m, i)$ is obtained by the below-shown Expression (3).

[Expression 1]

$$b_m = \sum_{i=m-w}^{i=m+w} (S_i \cdot p_t(m, i)) \quad (3)$$

In the expression, w represents the number of adjacent places that are taken into account. For example, assuming that the frame rate is constant, when the speed is high, the value of w may be set to, for example, one, whereas when the speed is low, the value of w may be set to two.

Note that it is possible to determine that the image $I_t$ matches the model m, i.e., the place is a known place based on the second state score $b_m$. However, in this exemplary embodiment the recognition ratio is further improved by normalizing this second state score $b_m$.

A normalized score (second estimated value) b_norm$_m$ can be obtained by Expression (4) (step S5).

[Expression 2]

$$b\_norm_m = \frac{\sum_{i=m-w}^{i=m+w} b_i}{2w \cdot n} \quad (4)$$

In the expression, n is a value that changes according to the moving speed of the place estimation apparatus and can be set to the maximum extraction number of position-invariant feature values obtained by the ICGM. The similarity-level calculation unit 14 obtains this normalized score b_norm$_m$. Further, the place recognition unit 15 recognizes that the image $I_t$ matches the model m, that is, the image $I_t$ is an image of a known place when this normalized score b_norm$_m$ is higher than a predetermined threshold (steps S6 and S7). Note that when the image $I_t$ matches the model m, the feature values of the model m can be updated by adding a position-invariant feature value(s) that is not included in the original model m into the model m. Further, when the feature values of each place are stored by using indexes as in the case of Patent Literature 3, only the indexes need to be increased. That is, it is possible to minimize the increase in the necessary memory capacity. Further, by employing a first-la first-out method, for example, for the feature values of the model m, there is no need to increase the memory capacity.

On the other hand, when the normalized score $b\_norm_m$ is lower than the predetermined threshold, the place recognition unit 15 recognizes the image $I_t$ as a new place (step S8) and, for example, registers a place where the image $I_t$ is shot and the position-invariant feature values extracted from the image $I_t$ into the common dictionary 12.

In this exemplary embodiment the feature value extraction unit 11 extracts feature values that are successively present in the temporal direction and remain in roughly the same positions as robust feature values. As a result, it is possible to separate feature values that move over time and hence effectively extract feature values that are effective for place recognition.

Further, in this exemplary embodiment, the center of gravity of the robust feature values is successively updated when the feature value extraction unit 11 extracts position-invariant feature values, and the robustness of other feature values are determined based on this updated center of gravity. The center of gravity includes therein information of the positional relation between feature values. Therefore, by using the center of gravity, the robustness can be tested while taking the position information into account. Further, the center of gravity can be easily calculated, thus enabling high-speed processing. In particular, in this exemplary embodiment, the center of gravity used in the robustness test for feature points is the center of gravity of all the feature points that have been determined to be robust up to that moment. In other words, there is no need to refer to all the position information on an enormous number of other feature values. That is, the stability of the position of a feature point can be evaluated just by evaluating the relation with only one center of gravity, thus making it possible to compress (or reduce) the data amount and the calculation amount.

<Second Exemplary Embodiment of the Present Invention>
(Extraction of Position-Invariant Feature Value—One-Way Approach and Both-Way Approach)

In the first exemplary embodiment, a method using images $I_t$ and $I_{t-1}$ at times t and t−1, respectively, is explained as a technique for extracting position-invariant feature values (ICGM). This technique is referred to as "one-way approach". In a second exemplary embodiment, a technique capable of extracting position-invariant feature values more effectively is explained. This technique is hereinafter referred to as "both-way approach".

Figure 5:
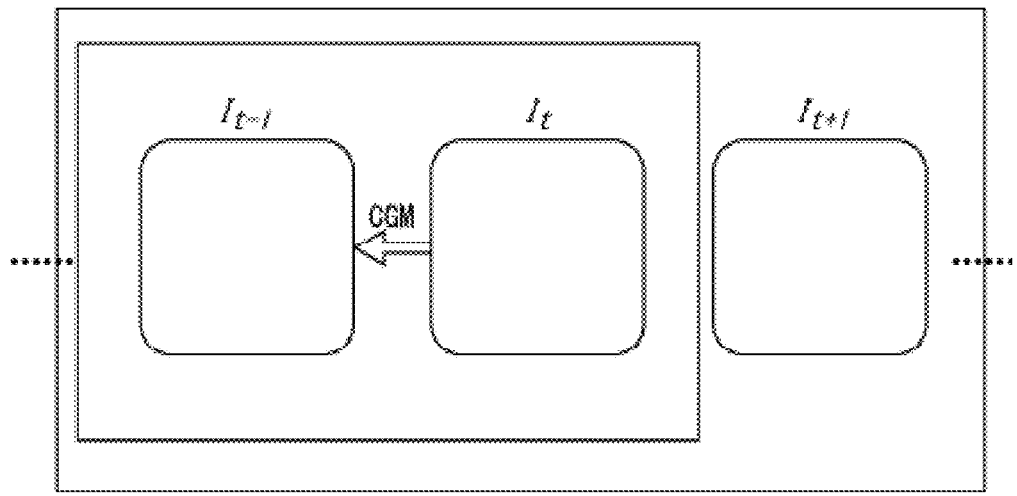
FIG. 5 shows an ICGM in a one-way approach.

FIG. 5 shows a one-way approach ICGM in which position-invariant feature values are extracted from images $I_t$ and $I_{t-1}$. In short, the one-way approach is an approach in which position-invariant feature values are extracted by comparing a current image with an image in the past. The position-Invariant feature values extracted in this manner are much more robust than those extracted from the image $I_t$ alone (by the SIFT, the SURF, or the like). However, in the one-way approach, there are cases where considerable losses of position-invariant feature values occur. Specific cases where losses could occur are explained later.

Figure 6:
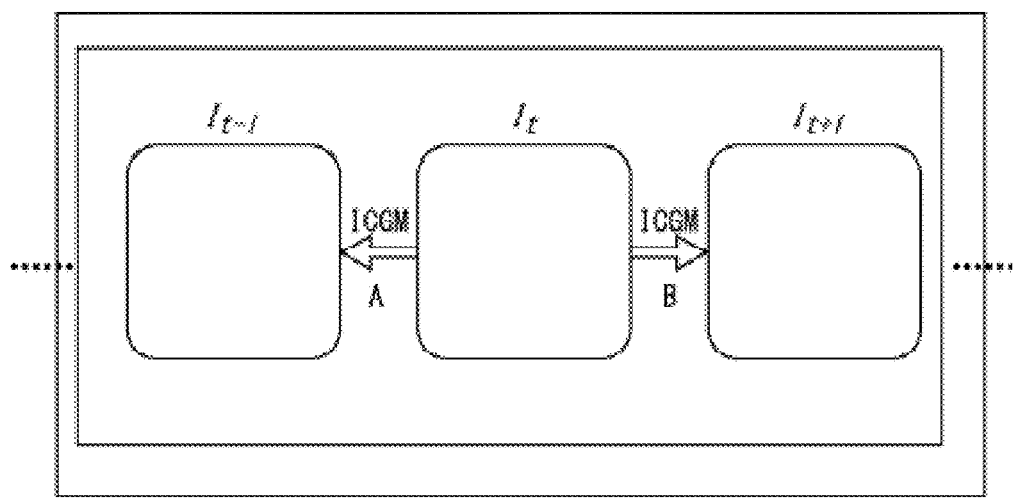
FIG. 6 shows an ICGM in a both-way approach.

FIG. 6 shows a concept of a both-way approach ICGM. In the both-way approach, firstly, position-invariant feature values A are extracted by comparing a current image $I_t$ with a past image $I_{t-1}$. Next, position-invariant feature values B are extracted by comparing the current image $I_t$ with an image $I_{t+1}$ in the future. After that, the logical sum of the position-invariant feature values A and B (i.e., C=A∪B) are used as the position-invariant feature value of the image $I_t$.

The inventor has found that when images are acquired by using an existing single-lens reflex camera or the like, the use of the both-way approach can extract position-invariant feature values more effectively. Specifically, the speed, the movement, and the like of the camera could affect the extractable position-invariant feature values. The inventor has examined two situations that could occur when an existing single-lens reflex camera is used. The two situations are a situation where the camera rotates at a constant speed, and a situation where the camera moves toward or away from an object that is located an infinite distance away from the camera. Further, the inventor has found that the both-way approach is superior to the one-way approach in both of these two typical situations.

Firstly, the case where the camera rotates at a constant speed is examined. The angular speed of the camera is represented by $\omega$ and its viewing angle is represented by $\gamma$. Further, the time by which the viewing field of the camera is completely changed to a different scene is expressed as "$T_{Disappear}=\gamma/\omega$". Further, the time required to carry out a feature value extraction by the one-way approach (from t−1 to t) is represented by $T_{Duration}$. It is assumed that position-Invariant feature values are uniformly distributed within the viewing field.

In this case, the extraction ratio of a number $P_\alpha$ of position-invariant feature values by the one-way approach is given by Expression (5).

[Expression 3]

$$P_\alpha = \begin{cases} \frac{T_{Disappear} - T_{Duration}}{T_{Disappear}} = 1 - \frac{T_{Duration}}{T_{Disappear}} & T_{Duration} \leq T_{Disappear} \\ 0 & T_{Duration} > T_{Disappear} \end{cases} \quad (5)$$

Meanwhile, the extraction ratio of a number $P_\beta$ of position-invariant feature values by the both-way approach is given by Expression (6).

[Expression 4]

$$P_\beta = \begin{cases} 1 & T_{Duration} < \frac{1}{2} \cdot T_{Disappear} \\ 2 \cdot P_\alpha & T_{Duration} \geq \frac{1}{2} \cdot T_{Disappear} \end{cases} \quad (6)$$

To compare these two approaches with each other, a parameter $\lambda_\alpha$ is defined by Expression (7).

$$\lambda_\alpha = T_{Duration}/T_{Disappear} \quad (7)$$

Figure 7:
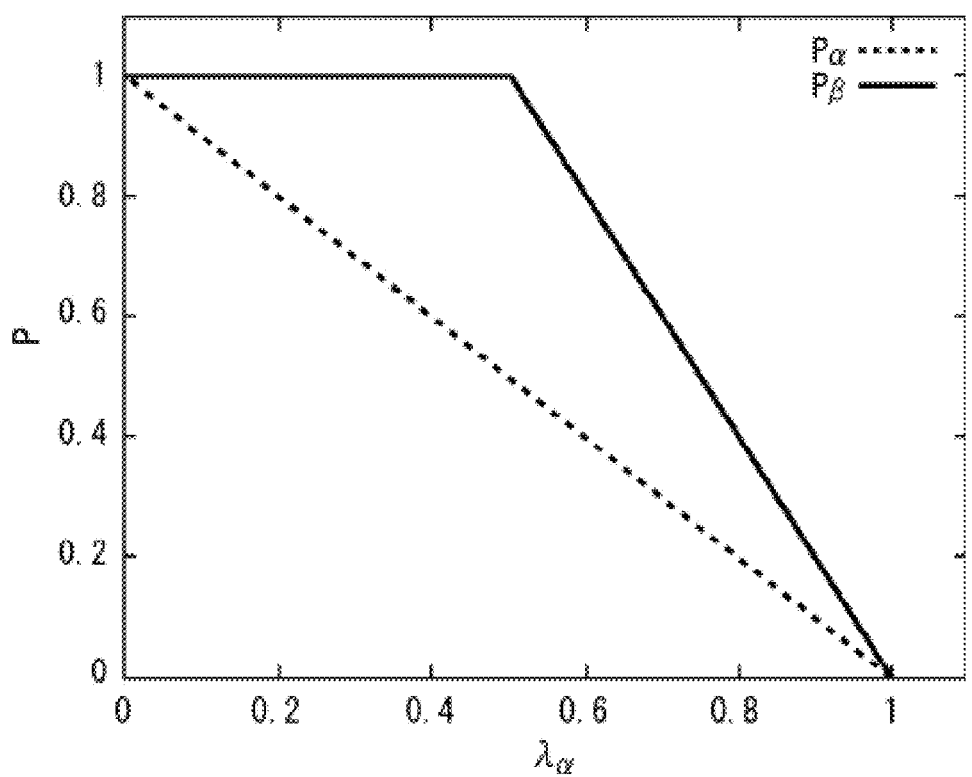
FIG. 7 is a graph showing a comparison between a one-way approach and a both-way approach.

As a result, $P_\alpha$ is expressed as "$P_\alpha=1-\lambda_\alpha$". FIG. 7 shows this. It can be seen from FIG. 7 that the both-way approach can extract more position-invariant feature values than the one-way approach does. Specifically, if $\lambda_\alpha \leq \frac{1}{2}$, the both-way approach can extract all the position-invariant feature values.

Next the case where the camera moves toward or away from an object that is located an Infinite distance away from the camera is examined. In this case, the time $T_{Duration}$ is also used in the same way as the above-described case. The vertical and horizontal viewing field angles are represented by $\eta$ and $\theta$, respectively. It is assumed that position-invariant feature values are uniformly distributed within the viewing field.

Note that in the case where the camera moves away from an object that is located an Infinite distance away from the camera, when the distance between the camera and the object is represented by d, the viewing field s of the camera is given by Expression (8).

$$s = 4 \cdot \tan(\eta) \tan(\theta) \cdot d^2 \quad (8)$$

At a point that is a time $T_{Duration}$ before the execution of the feature value extraction, that is, at a time $t-T_{Duration}$, the distance d' between the camera and the object is expressed as "$d'=d-T_{Duration} \cdot v$". Therefore, the viewing field s' at the time $t-T_{Duration}$ is expressed by Expression (9).

$$s' = 4 \cdot \tan(\eta) \tan(\theta) \cdot (d - T_{Duration} \cdot v)^2 \quad (9)$$

Accordingly, the following relation holds.

[Expression 5]

$$P_\alpha = \frac{s'}{s} = \frac{(d - T_{Duration} \cdot v)^2}{d^2} \quad (10)$$

Similarly, $\lambda_\beta$ is defined as follows, $$\lambda_\beta = T_{Duration} \cdot v/d \quad (11)$$

In the case where the camera moves away from the object, since position-invariant feature value extraction process is performed by using the current and past information in the one-way approach, part of the current information is abstracted. That is, $P_\alpha$ is expressed as "$P_\alpha=(1-\lambda_\beta)^2$" In contrast to this, the current, past, and future information is used for the processes in the both-way approach. Since the viewing field of the camera in the future is wider than that at the current time, the losses of the information included in the current viewing field are zero. That is, $P_\beta$ is always one ($P_\beta=1$).

Figure 8:
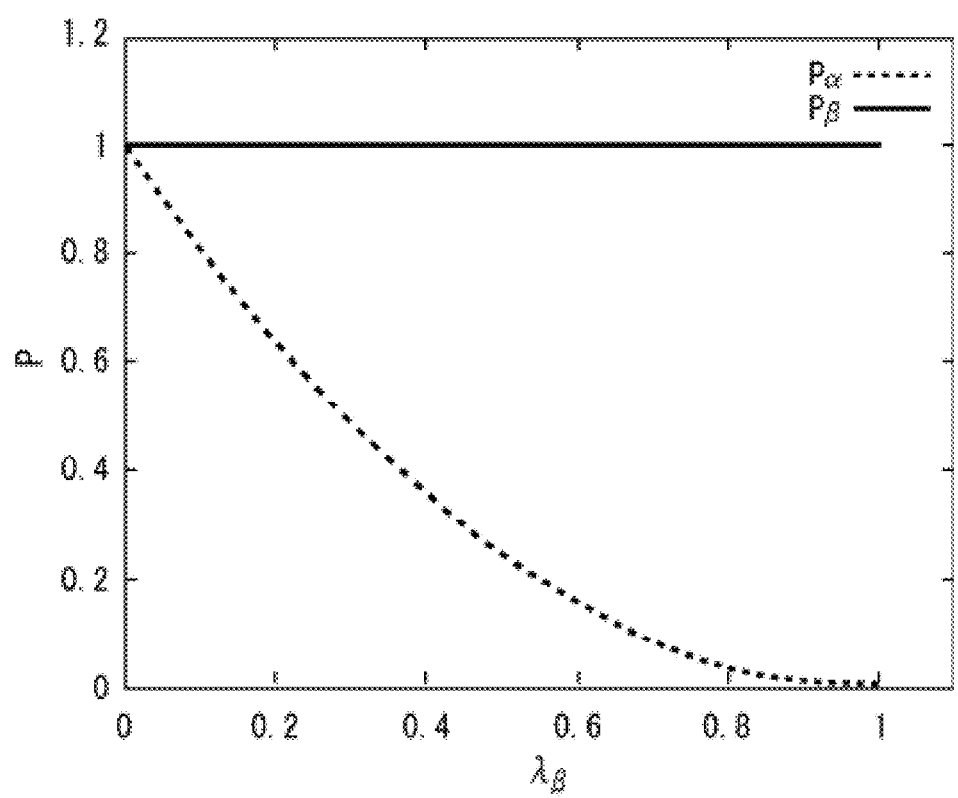
FIG. 8 is a graph showing a comparison between a one-way approach and a both-way approach.

In the case where the camera moves toward an object that is an infinite distance away from the camera, since information of the current viewing field and the past viewing field, which is wider than the current viewing field, is used for the processes, the losses of the information are always zero. That is, $P_\alpha$ and $P_\beta$ are both one ($P_\alpha=1$ and $P_\beta=1$). FIG. 8 shows a comparison between the one-way approach and the both-way approach.

As explained above, the both-way approach can extract position-invariant feature values from a kinetic environment more effectively than the one-way approach does. The following are main differences between these two approaches. The one-way approach extracts only feature values that have been present in the environment from the past as position-invariant feature values. In contrast to this, the both-way approach extracts, in addition to the aforementioned feature values, feature values that are present in the environment from the current time to the future as position-Invariant feature values. In other words, since the both-way approach uses two information sets, i.e., a set of past and current information and a set of current and future information, the both-way approach can solve various problems present in the one-way approach.

Note that when the above-described parameters $\lambda_\alpha$ and $\lambda_\beta$ are raised, the extracted feature values become more robust. However, by doing so, the number of extracted feature values decreases. The both-way approach is effective when it is desired to secure a sufficient number of extracted robust feature values while raising the parameters $\lambda_\alpha$ and $\lambda_\beta$.

In this exemplary embodiment, it has been explained that the both-way approach is effective in both of the two typical situations related to the camera movements. Since general movements of a camera can be decomposed into a combination of such simple situations, it can be said that in general, the both-way approach can extract robust feature values more effectively than the one-way approach does.

The one-way approach ICGM and the both-way approach ICGM are advantageous for the PIRF. The PIRF is also a technique that is used to extract robust feature values from successive images. In the algorithm shown in FIGS. 3 and 4, when the threshold Thr is raised to infinity (Thr->∞), feature values extracted in the one-way approach ICGM get closer to those extracted by the PIRF. However, in the PIRF, when the window size is equal to two (window size=2), that is, when two images are used, sufficiently robust feature values cannot be extracted. This has caused the following problem. If it is desired to further extract robust feature values in the PIRF, it is necessary to further increase the window size. However, when the widow size is increased, the number of extracted feature values significantly decreases. In contrast to this, in the ICGM, by lowering the threshold Thr, feature values that are more robust than those in the PIRF (window size=2) can be extracted. Further, the number of extracted feature values can be increased by using the both-way approach. These features of the ICGM provide excellent effects when, for example, the later-described SLAM process or the like is performed.

<Third Exemplary Embodiment of the Present Invention>

Next as a third exemplary embodiment, examples of experiments in which the feature value extraction technique shown above as the first and second exemplary embodiments and the place recognition technique are applied to real environments are shown. Advantageous effects of the present invention are also explained together with them.

(A) Feature Value Extraction Experiment by ICGM

This experiment is an experiment for examine the accuracy of feature values extracted by the ICGM. Feature values are extracted from a plurality of images by using the ICGM and the SURF, and whether matching for feature values is obtained between the plurality of images or not is compared to each other.

Figure 9A:
FIG. 9 shows feature value extraction experiment result by an ICGM.

Datasets (two images shown in FIG. 9(a)) used for this experiment were both captured in an indoor environment (were shot indoors). Further, this environment includes therein several moving objects. In this figure, a spray bottle encircled by an ellipse has been moved between the front and back images. Further, the shooting range of the camera has also moved in the horizontal direction between the two images.

Figure 9B:
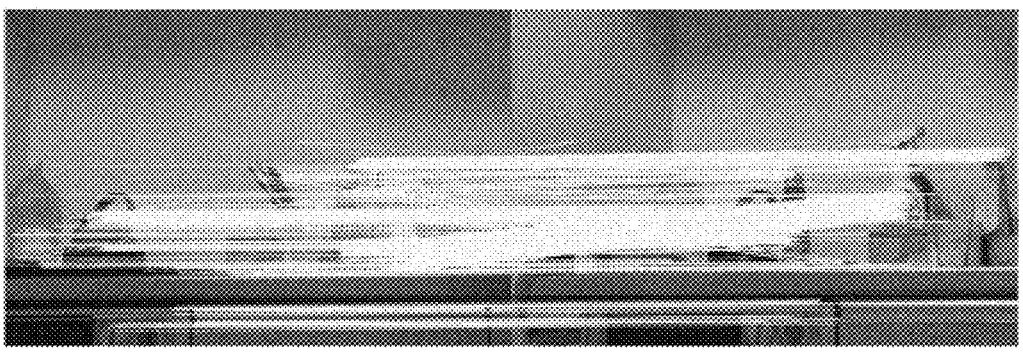

FIG. 9(b) shows a state where feature points are extracted from the two images and matching between corresponding feature points is performed by the SURF. In this figure, corresponding feature points are connected to each other by bright lines. If the matching is correctly made, all the bright lines have to be horizontal. However, it can be seen in this figure that a lot of bright lines are inclined. That is, in this example, the matching includes a lot of errors. In addition, matching is also made for the moved object.

Figure 9C:
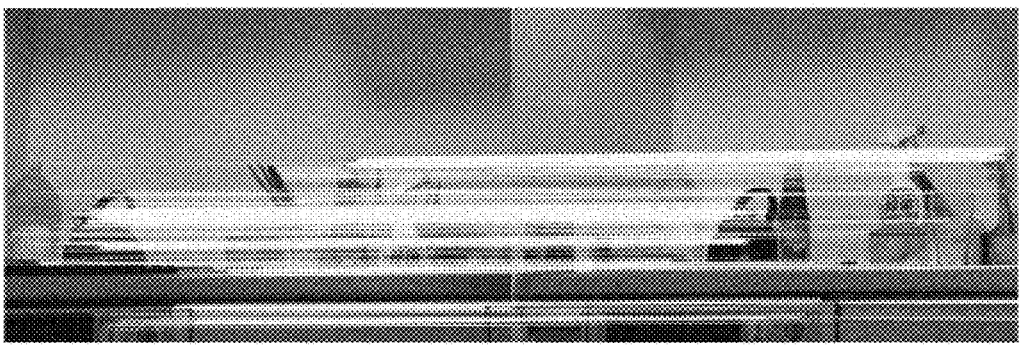

FIG. 9(c) shows a state where position-invariant feature values are extracted from two images and matching between corresponding feature points is performed by the ICGM. In this figure, most of the bright lines are horizontal, indicating that the matching is correctly performed. Further, the moved object is not regarded as an object to be matched, and thus is ignored.

Note that the number of the feature values for which matching was performed in the SURF was 975, and that for which matching was performed in the ICGM was 374. This experiment shows that the ICGM can stably and effectively extract robust feature values, i.e., position-invariant feature values even in the kinetic environment in which the camera moves.

(B) Place Recognition Experiment in Shibuya Train Station

In the following experiment, the ICGM was applied to SLAM (Simultaneous Localisation and Mapping). In experiments in Patent Literature 3 and Non-patent Literature 1 similar to this experiment, feature values extracted by the PIRF were used, in contrast to them, feature values extracted by the ICGM are used in this experiment.

Figure 10:
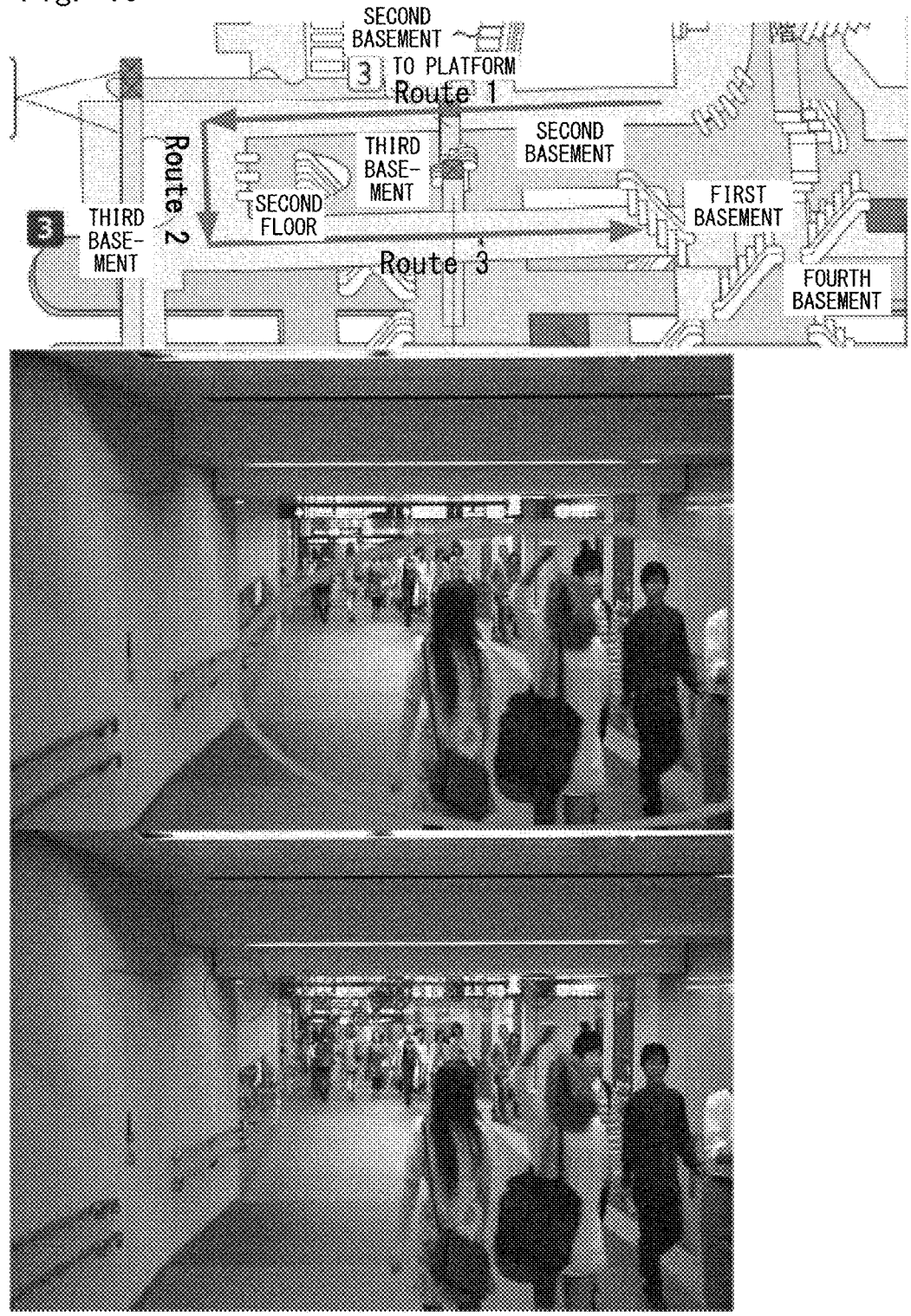
FIG. 10 shows a place recognition experiment in Shibuya train station.

Strictly speaking, this experiment is not the SLAM. However, it is suitable to test the accuracy of ICGN place recognition. A dataset used in this experiment is images that were shot at a rate of 0.5 frames per second by using a handheld camera (the resolution was resized to 480*320). When the images were taken, Shibuya train station was crowded with a lot of people. The length of the route along which shooting was performed to acquire learning data was about 80 meters, and the learning time was five minutes (FIG. 10).

Figure 11:
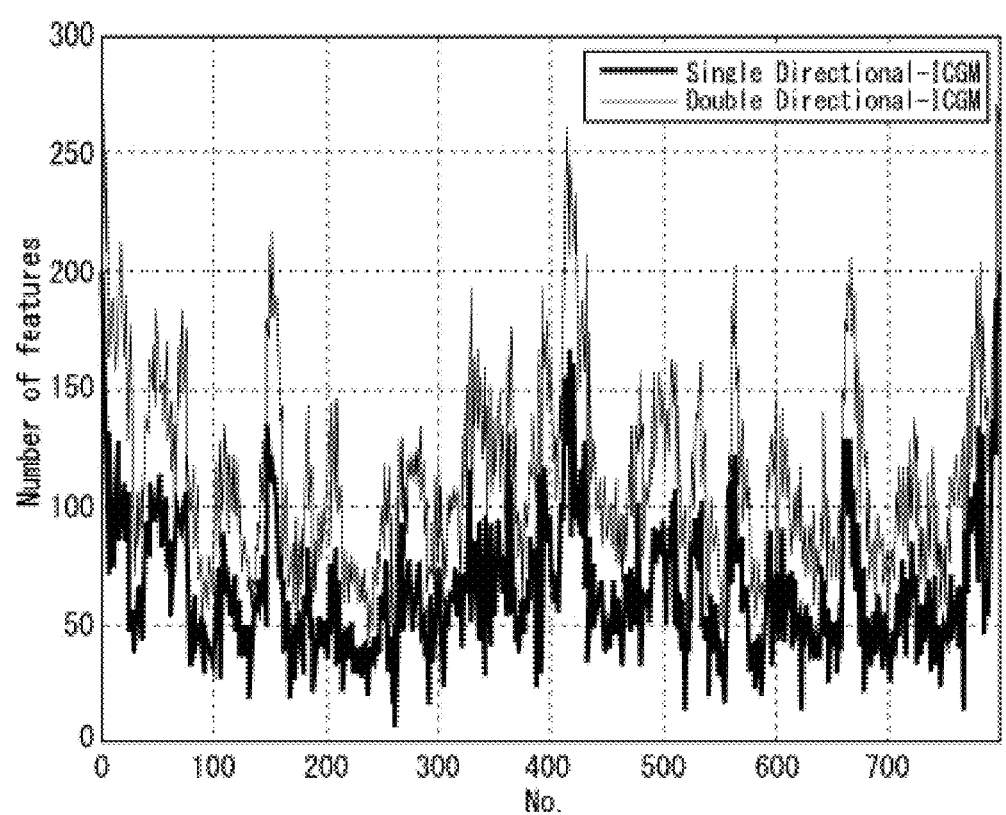
FIG. 11 is a graph showing a comparison between a one-way approach and a both-way approach.

Firstly, the learning data was stored in a learning database. Further, feature values were extracted from the learning data and a common dictionary 12 was thereby constructed by using the ICGM and the PIRF. Then, feature values were extracted from test images in a similar manner. Finally, experiments for estimating places were carried out by using both feature values. Note that FIG. 11 shows a comparison between when the both-way approach is used and when the one-way approach is used in the case where the ICGM is used. It can be understood that the both-way approach can extract more position-invariant feature values than the one-way approach does.

As a result of the experiment, the accuracy of the place recognition using the PIRF was 82.65 percent. Meanwhile, die accuracy of the place recognition using the ICGM was 98.56%.

(c) Minamidai Outdoor Experiment (SLAM)

Figure 12:
FIG. 12 shows a Minamidai outdoor experiment.

A dataset used in this experiment is images that were shot at a rate of 0.5 frames per second by using a handheld camera (the resolution was resized to 480*320). In this experiment, there were several kinetic objects (cars and people) when the images were taken, though the environment was not crowded (FIG. 12). The length of the route along which shooting was performed to acquire learning data was about 170 meters, and the learning time was 9.5 minutes.

Figure 13:
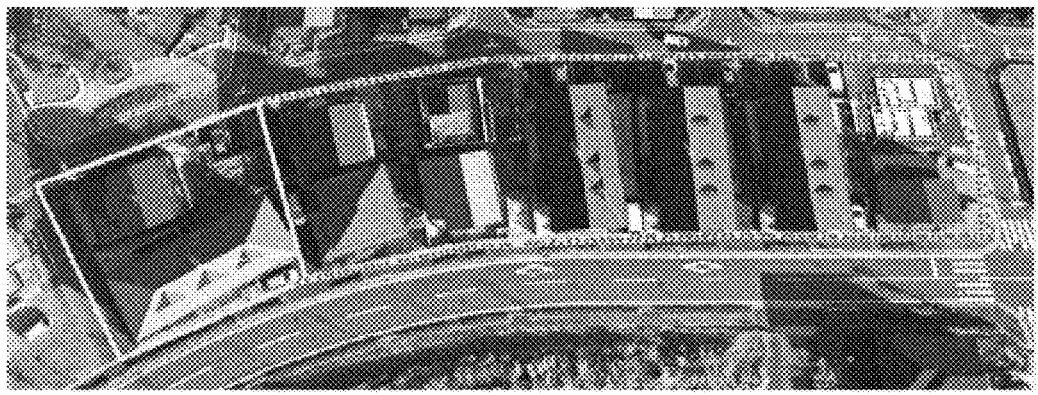
FIG. 13 shows a result of the Minamidai outdoor experiment.

FIG. 13 shows an experiment result. The solid lines indicate the route along which places were learned. The dots indicate coordinates at which places were successfully recognized, it can be seen that places that were learned in the first lap along the route were correctly recognized in the second lap.

FIG. 14 shows the accuracy of this experiment. The accuracy of the place recognition using the ICGM (Proposed method) is better than those of the PIRF-nav2.0 (technique disclosed in Patent Literature 3 and Non-patent Literature 1) and the publicly-known FAB-MAP. Note that in the Proposed method (real-time), the one-way approach was used in the place estimation phase. Further, in the Proposed method (non-real-time), the both-way approach was used in the place estimation phase. The number of extracted feature values in the Proposed method (non-real-time) is larger than that in the Proposed method (real-time), indicating that the accuracy of the Proposed method (non-real-time) is improved in the Proposed method (non-real-time). Note that the FAB-MAP is the fastest because this technique is a hatch processing technique.

Note that when the both-way approach is used to extract feature values of an image $I_t$, an image $I_{t+1}$ is also necessary. In other words, information (image) of a future event is necessary. In other words, since feature values of the image $I_t$ need to be extracted after the image $I_{t+1}$ is acquired, the feature values cannot be extracted at the time t in real time. That is, some time lag is required. Therefore, in a real-time system such as a robot, the both-way approach cannot be used in its place recognition phase that requires a real-time characteristic. In such cases, it is necessary to use the one-way approach. However, even in a real-time system, the both-way approach can be used in the dictionary creating phase that does not require a real-time characteristic. Further, for example, for the use for a pedestrian navigation system and the like, a strict-sense real-time characteristic is not substantially required. Therefore, it is possible to improve its system performance by using the both-way approach for both the dictionary creating phase and the place recognition phase.

<Fourth Exemplary Embodiment of the Present Invention>

As described above, a place can be identified from an image and a dictionary can be updated on-line according to the present invention. Therefore, for example, when the present Invention is combined with a moving picture shooting function of a portable device, the following applications can be provided.

When a person gets lost in a department store, a shopping mall, or the like, the person shoots a scene around him/her by swinging the portable device around him/her and sends the shot image to a server. The server analyzes the image, and thereby can reply where the person is located, or additionally what kinds of facilities and shops are present around the person.

GPSs cannot be used indoors, in contrast to them, in this exemplary embodiment a search moving picture sent from a user can also be used as data for updating a dictionary and a map. Therefore, the dictionary and the map can always be updated. Note that in principle, the map data of conventional car navigation systems cannot be updated, or the updating is considerably and requires considerable costs.

In a mobile phone network, there are base stations each of which is in charge of and manages its service area. Therefore, each base station may possess and update a map of the range which that base station is in charge of. That is, there is no need to prepare an enormous dictionary, thus making it possible to considerably save the memory and the calculation speed. There is a high possibility that wearable visions (cameras) such as glasses appears in the feature. Such glasses will be able to always identify the place and provide useful information.

<Fifth Exemplary Embodiment of the Present Invention>

In a fifth exemplary embodiment, a technique for extracting position-invariant feature values that are robust even to distortions of images, rotation, shearing, translation, scaling, and so on, and thereby carrying out place estimation with higher accuracy.

(Correction of Image Distortion)

There are cases where an image is distorted due to the lens characteristic of a camera. In order to extract accurate corresponding feature values and position-invariant feature values from images, it is preferable that images do not have such distortions.

For example, OpenCV is known as a technique for correcting an image distortion. According to the OpenCV, a distortion can be corrected by acquiring internal parameters ($f_x$, $f_y$, $c_x$, $c_y$), coefficients ($k_1$, $k_2$) indicating a radial distortion, coefficients ($p_1$, $p_2$) indicating a tangential distortion by calibrating the camera, and using the acquired internal parameters and the distortion coefficients. Note that the aforementioned internal parameters and the distortion coefficients are intrinsic values of the camera.

The local feature value extraction unit 21 preferably performs the above-described distortion correction process before extracting feature values from the images. As a result, the corresponding feature value selection unit 23 and the position-invariant feature value extraction unit 24 can extract corresponding feature values and position-invariant feature values with higher accuracy.

(Order Restriction)

In the above-described exemplary embodiments, a process in which the corresponding feature value selection unit 23 extracts a set of corresponding feature values is explained. Incidentally, pairs of feature values that do not truly correspond to each other, but are mistakenly determined to be corresponding feature values could be included in a set of corresponding feature values. The inventor has developed an order restriction for excluding such pairs of feature values that are mistakenly determined to match each other.

Figures 15, 16:
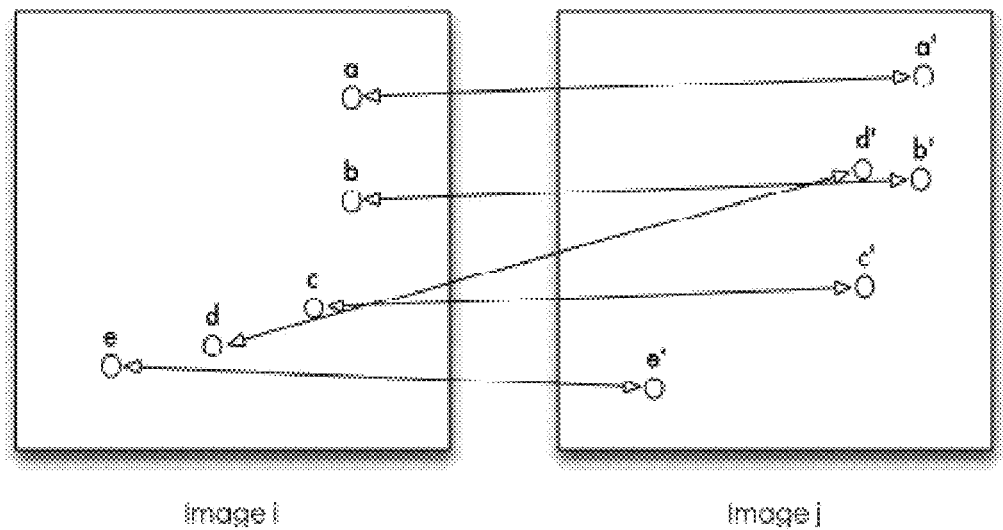
FIG. 15 shows a corresponding feature value extraction process.
FIG. 16 shows a corresponding feature value extraction process.

In FIG. 15, a feature value set "W=(a, b, c, d, e)" and a set "W'=(a', b', c', d', e')" represent sets of corresponding feature values extracted from two images. Here, it is assumed that each of "a and a'", "b and b'", "c and c'", and "e and e'" are a correctly-matched pair of feature values. In contrast to this, "d and d'" are an incorrectly-matched pair of feature values.

To determine whether given points i and i' are incorrectly matched feature points or not the corresponding feature value selection unit 23 first obtains relative distance vectors $D_i$ and $D_i'$ of the points i. For example, a relative distance vector for the point a in FIG. 15 is defined as "$D_a$=(b, c, d, e)". Note that the points b, c, d and e have been sorted in the acceding order of their distances from the pint a. Similarly, a relative distance vector for the point a' in FIG. 15 is defined as "$D_a'$=(d', b', c', e')".

Next, the corresponding feature value selection unit 23 obtains an index "offset" by using the vectors $D_i$ and $D_i'$ for the points i and i'. FIG. 16 shows a method for calculating "offset". When the s-th element of the vector $D_i$ is $W_b$, and $W_b'$ which is matched with $W_b$, is the k-th element of the vector $D_i'$, "offsets" is defined as "|k−s|".

Further, the corresponding feature value selection unit 23 obtains an index "diff($D_i$, $D_i'$)" by using the "offset". The diff($D_i$, $D_i'$) is defined by Expression (12).

[Expression 6]

$$\text{diff}(D_i, D_{i'}) = \frac{\sum_{k=1}^{n} \text{offset}_k}{n^2} \quad (12)$$

The diff($D_i$, $D_i'$) is an index indicating that the larger its value is, the higher a possibility that they are incorrect matching is. That is, the diff($D_i$, $D_i'$) can be used to determine whether the matched pair of feature values is correct matching or incorrect matching. For example, in the example shown in FIG. 15, diff($D_a$, $D_a'$) and diff($D_d$, $D_d'$) were calculated as follows: diff($D_a$, $D_a'$)=0.25; and diff($D_d$, $D_d'$)=11/16. This means that the possibility that the pair of feature values d and d' is incorrect matching is relatively high.

Incidentally, the diff($D_i$, $D_i'$) is not an affine-invariant quantity and is not sensitive to the noise ratio. Therefore, $\text{diff}_{normal}$ that is obtained by normalizing the diff($D_i$, $D_i'$) is examined. The $\text{diff}_{normal}$ can be calculated by Expression (13) by using an average $\mu_{diff}$ and a standard deviation $\sigma_{diff}$.

[Expression 7]

$$\text{diff}_{normal} = \frac{\text{diff} - \sigma_{diff}}{\mu_{diff}} \quad (13)$$

The corresponding feature value selection unit 23 calculates $\text{diff}_{normal}$ for a given pair of feature values i and i'. Then, when $\text{diff}_{normal} > T_{OC}$, the corresponding feature value selection unit 23 determines that the pair of feature values i and i' should be eliminated from the set of corresponding feature values, i.e., determines that they are incorrectly matched. Note that $T_{OC}$ is an arbitrary threshold.

In the example shown in FIG. 15, d and d' may be excluded based on an appropriately-defined threshold $T_{OC}$. As a result, a feature value set "$W_{OC}$=(a, b, c, e)" and a set "$W'_{OC}$=(a', b', c', e')" having higher reliability are obtained.

As described above, according to the order restriction, incorrectly-matched corresponding feature values can be excluded, thus making it possible to construct a set of corresponding feature values having higher accuracy.

(Area Restriction)

In the above-described exemplary embodiments, a process in which the position-invariant feature value extraction unit 24 extracts position-invariant feature values is explained. The inventor has developed an area restriction as a technique for calculating position-invariant feature values with higher accuracy.

Figure 17:
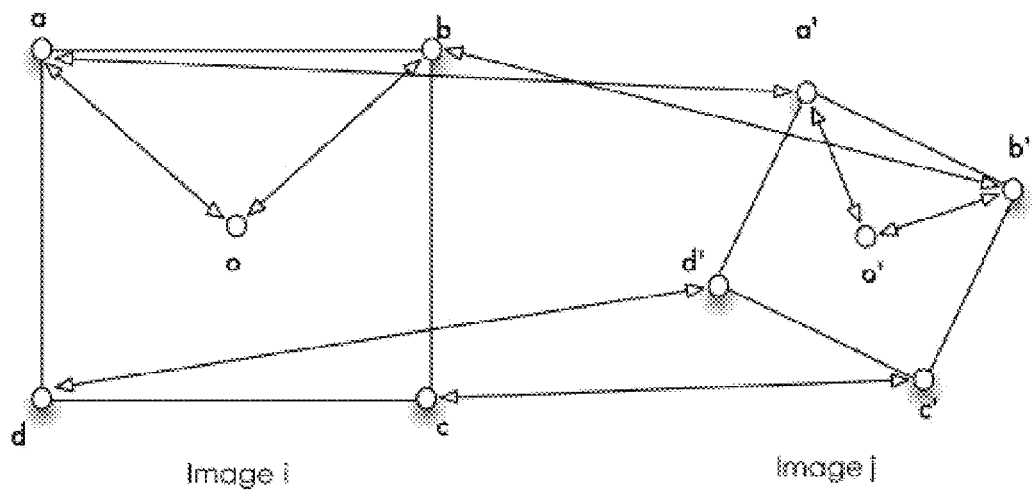
FIG. 17 shows a position-invariant feature value extraction process.

Firstly, a concept of the area restriction is explained. Deformations of figures including rotation, shearing, translation, and scaling are called "affine transformations". FIG. 17 shows an example of an affine transformation. In this example, rotation and contraction are performed between two images. Note that W(a, b, c, d) and W'(a', b', c', d') are sets of corresponding feature values for the two images. Further, the symbol "o" represents the center of gravity of at least one point included in W, and "o'" represents the center of gravity of at least one point included in W'.

When these two images are compared with each other, the coordinates of the feature points a, b, c and d included in the set W are significantly different from those of the feature points a', b', c' and d' included in the set W'. Meanwhile, the proportionality among the areas S (or sizes S) of a plurality of figures that are formed by using these feature points as their vertices is not changed. That is, relations "$S_{aob}/S_{abcd}=S_{a'o'b'}/S_{a'b'c'd'}$", "$S_{aob}/S_{abc}=S_{a'o'b'}/S_{a'b'c'}$", and "$S_{aob}/S_{aoc}=S_{a'o'b'}/S_{a'o'c'}$" hold. A quantity that is invariant to an affine transformation like this area ratio is called "affine-invariant quantity". Further, this property is called "affine invariance".

When figures having such affine-invariant area proportionality are found in sets of corresponding feature values extracted from two images, it can be considered that these two figures are affine-transformed figures, i.e., figures that are obtained by observing the same object from different viewpoints. Therefore, feature points constituting these figures can be regarded as position-invariant feature values.

In the techniques mentioned in the above-described exemplary embodiments, there are cases where, for example, position-invariant feature values cannot be accurately extracted from two images that are obtained by observing an object at different angles, in contrast to this, the area restriction can make it possible to extract position-invariant feature values with higher accuracy even from such two images.

Strictly speaking, since the real world is not necessarily flat, images that are obtained by shooting the real world are not affine-invariant. However, most of the main elements in images can be considered to be substantially flat, it can be said that the area restriction is effective.

Based on this knowledge, a specific procedure through which the position-invariant feature value extraction unit 24 extracts position-invariant feature values is explained hereinafter. It is assumed that the below-shown process is performed for sets of corresponding feature values that are extracted according to the above-described order restriction.

Firstly, the position-invariant feature value extraction unit 24 calculates a total area $S_\Sigma$ (or total size $S_\Sigma$) formed by feature points included in a set W by Expression (14).

[Expression 8]

$$S_\Sigma = \Sigma_{i=1}^{n-1} S_{i,o,i-1} \quad (14)$$

Further, the position-invariant feature value extraction unit 24 calculates the center of gravity o of the feature points included in the set W by Expression (15),

[Expression 9]

$$o = \frac{\sum_{i=1}^{n} w_i}{n} \quad (15)$$

Next, the position-invariant feature value extraction unit 24 calculates a deviation of an area ratio for size ratio) of figures that are formed by using a given feature point i by Expression (16). Note that o represents the center of gravity and j represents an arbitrary feature point other than the feature point i,

[Expression 10]

$$Dev_{ai}^{i,j} = \left\| 1 - \frac{\frac{S_{ioj}}{S_\Sigma}}{\frac{S_{i'o'j'}}{S'_\Sigma}} \right\| \quad (16)$$

Here, regarding $$Dev_{ai}^{i,j} \quad \text{[Expression 11]}$$

(hereinafter, expressed as "Dev"), if Dev=0, the figure using the feature point i has been completely affine-transformed. Further, if Dev<$T_{AC}$, the figure using the feature point i is considered to have been affine-transformed. Note that $T_{AC}$ is an arbitrary threshold and the robustness of the affine transformation can be adjusted by the threshold $T_{AC}$.

Incidentally, it is important to obtain reliable centers of gravity o and o' in order to obtain accurate position-invariant feature values by the area restriction.

An algorithm 2 shown in FIG. 18 is for a process for excluding feature points that are not affine-transformed from sets of corresponding feature values. By this process, the position-invariant feature value extraction unit 24 can extract position-invariant feature values. Further, the reliability of the centers of gravity o and o' gradually improves through the calculation. The process related to this algorithm 2 is as follows.

Input:
Firstly, sets W and W' of corresponding feature values are input. Note that each of the sets W and W' is preferably a set of feature values extracted by the above-described order restriction.

Step 1:
Firstly, the sets W and W' are used as initial values of sets $W_{tmp}$ and $W'_{tmp}$ of feature values. Centers of gravity o and o' and total areas $S_\Sigma$ and $S'_\Sigma$ are calculated for these $W_{tmp}$ and $W'_{tmp}$, respectively, by Expressions (14) and (15). Further, the size of the set $W_{tmp}$, i.e., the number of feature values included in the set $W_{tmp}$ is stored as "SizePrevious".

Step 2:
By paying attention to a pair of corresponding feature values i and i' included in the sets $W_{tmp}$ and $W'_{tmp}$, respectively, $$AveDev_{ai}^i \quad \text{[Expression 12]}$$

(hereinafter expressed as "AveDev") is calculated by Expression (17). Here, if AveDev>$T_{AC}$, it is recognized that the pair of corresponding feature values i and i' are not affine-transformed. Therefore, the feature values i and i' are removed from the sets $W_{tmp}$ and $W'_{tmp}$, respectively,

[Expression 13]

$$AveDev_{ai}^j = \frac{\sum_{k=i}^{n} Dev_{ai}^{j,k}}{n} \quad (17)$$

The above-described AveDev determination process is performed for every corresponding feature value included in the sets $W_{tmp}$ and $W'_{tmp}$.

End Determination:
After these processes, the size of the set $W_{tmp}$ is compared with the SizePrevious stored in the Step 1. Here, if both sizes are equal to each other, it is considered that all the corresponding feature values that should be removed have been removed. Therefore, the process is finished. On the other hand, when both sizes are different from each other, the removal of the corresponding feature values is still in progress. Therefore, the process returns to the Step 1 and continues from there.

An algorithm 3 shown in FIG. 19 is for a process for correcting the calculation result of the algorithm 2. The position-invariant feature value extraction unit 24 re-inspects, according to the algorithm 3, the feature values excluded by the algorithm 2 by using the centers of gravity o and o' at the time when the process according to the algorithm 2 has been finished. In this way, it is possible to relieve (or revive) all the feature values that should be regarded as position-invariant feature values but have been mistakenly excluded by the algorithm 2 at the earlier stage of the calculation according to the algorithm 2, i.e., at the time when the reliability of the centers of gravity o and o' was still low. The process related to this algorithm 3 is as follows.

Input:
Firstly, sets W and W' of corresponding feature values, and sets $W_{tmp}$ and $W'_{tmp}$ are input. Note that the sets W and W' are the same sets of feature values as the sets W and W' that were input in the algorithm 2. Further, the sets $W_{tmp}$ and $W'_{tmp}$ are the output of the algorithm 2.

Step 1:
Firstly, centers of gravity o and o' and total areas $S_\Sigma$ and $S'_\Sigma$ are calculated for these sets $W_{tmp}$ and $W'_{tmp}$, respectively, by Expressions (14) and (15). Further, the size of the set $W_{tmp}$, i.e., the number of feature values included in the set $W_{tmp}$ is stored as "SizePrevious".

Step 2:
Attention is paid to a pair of corresponding feature values i and i' included in the sets W and W', respectively. Then, when feature values i and i' are not included in the sets $W_{tmp}$ and $W'_{tmp}$, AveDev is calculated by Expression (17). Here, if AveDev<$T_{AC}$, it is determined that the pair of corresponding feature values i and i' has been affine-transformed by using the reliable centers of gravity o and o'. Therefore, the feature values i and i' are included into the sets $W_{tmp}$ and $W'_{tmp}$. The above-described determination process is performed for every corresponding feature value included in the sets W and W'.

End Determination:

After these processes, the size of the set $W_{tmp}$ is compared with the SizePrevious stored in the Step 1. Here, if both sizes are equal to each other, it is considered that all the position-invariant feature values that should be relieved have been relieved. Therefore, the process is finished. At this point, the contents of the sets $W_{tmp}$ and $W'_{tmp}$ are output as sets $W_{AC}$ and $W'_{AC}$. On the other hand, when both sizes are different from each other, the relief (or revival) of the position-invariant feature values is still in progress. Therefore, the process returns to the Step 1 and continues from there.

(Place Estimation)

A set $W_{AC}$ of accurate position-invariant feature values is obtained through the above-described series of processes. The use of this set $W_{AC}$ makes it possible to perform place estimation with higher accuracy.

A similarly level $S_{cg}(z_t, z_c)$ between a current place $z_c$ and a place $z_t$ to be compared can be calculated by Expression (18).

[Expression 14]

$$S_{cg}(z_t, z_c) = S_{Affine} * S_{Dispersion} \quad (18)$$

Note that $S_{Affine}$ is calculated by Expression (19).

[Expression 15]

$$S_{Affine} = \text{sizeof}(W_{AC})/N_{Pair} \quad (19)$$

In the expression, $N_{pair}$ represents the size of a set of corresponding feature values obtained from images of two places by the corresponding feature value selection unit 23. It is assumed that this set of corresponding feature values is a set for which the above-described correction according to the distance restriction has not performed yet. That is, $S_{Affine}$ indicates the matching level between feature values for which the series of processes according to the distance restriction and the area restriction has not performed yet and those for which the series of processes has been already performed. Note that $S_{Affine}$ is no less than zero and no greater than one ($0 \leq S_{Affine} \leq 1$).

$S_{Dispersion}$, can be calculated by Expression (20).

[Expression 16]

$$S_{Dispersion} = \begin{cases} 2 - \dfrac{D}{D'}, & D' \leq D \leq 2D' \\ 2 - \dfrac{D'}{D}, & D \leq D' \leq 2D \\ 0, & D' \geq 2D \text{ or } D \geq 2D' \end{cases} \quad (20)$$

Note that $D^{(\cdot)}$ can be calculated by Expression (21).

[Expression 17]

$$D^{(\prime)} = \frac{\sum_{i=1}^{n} w_i^{(\prime)} - o^{(\prime)}}{n} \quad (21)$$

$S_{Dispersion}$ is an index for evaluating the similarity level for two images including affine-invariant feature values more precisely. $S_{Dispersion}$ has such an effect that the larger the difference between the average distance between all the feature points included in a set of corresponding feature values and their center of gravity o in one of two images and the average distance in the other image becomes, the smaller the similarity level becomes. As a result, for example, when images that are images of the same object but have different sizes are included in two images (such as when the same object is shot from different positions), it is possible to determine that the shooting places of these two images are different from each other. Note that $S_{Dispersion}$ is greater than zero and less than one ($0 < S_{Dispersion} < 1$).

Incidentally, as a technique for evaluating a similarity level that has been proposed from the past, there is Expression (22). In the expression $N_{zt}$ and $N_{zc}$ represent the total numbers of local feature values acquired in places $z_t$ and $z_c$, respectively.

[Expression 18]

$$s(z_i, z_c) = \begin{cases} \dfrac{N_{pair}}{N_{z_t}}, & N_{zt} \leq N_{zc} \\ \dfrac{N_{pair}}{N_{z_c}}, & N_{zc} < N_{zt} \end{cases} \quad (22)$$

In contrast to this, a technique for calculating a similarity level proposed by the inventor is shown as Expression (23).

[Expression 19]

$$S_{Combined} = \frac{s_{cg}(z_t, z_c) * N_{pair}}{N_{zt} + N_{zc}} \quad (23)$$

This technique makes it possible to perform similarity-level calculation with higher accuracy because the similarity level is calculated by using position-invariant feature values containing fewer (or smaller) noises extracted by using geometrical restrictions such as the distance restriction and the area restriction.

(Experiment Result)

Lastly, experiment examples in which the feature value extraction technique and the place recognition technique that are shown above as the fifth exemplary embodiment are applied to real environments are shown.

An experiment similar to the Minamidai outdoor experiment, which was carried out according to the third exemplary embodiment, was carried out by using the technique according to the fifth exemplary embodiment (a position-invariant feature value calculation method by the distance restriction and the area restriction; hereinafter called "affine-ICGM (real-time)").

The result of place recognition using the affine-ICGM (real-time) was as follows: Racall=97.5%, Precision=98.5%, and Total Processing Time=194.3 sec. That is, the affine-ICGM (real-time) is superior to the ICGM (real-time) and the ICGM (non-real-time) according to the above-described exemplary embodiments in both the accuracy and the processing time.

<Other Exemplary Embodiments of the Present Invention>

Note that the present invention is not limited to the above-described exemplary embodiments, and needless to say, various modifications can be made to them without departing from the scope and spirit of the present invention.

For example, in the above-described exemplary embodiments, the present invention is explained on the precondition that feature values are two-dimensional. However, feature values may have three dimensions or more, provided that the feature values can be acquired from an environment. For example, by using Kinect (registered trademark), depth information in addition to the two-dimensional image information can be acquired, thus enabling the extraction of three-dimensional feature values. Note that position-invariant feature values can be extracted by the algorithms shown in Figs. X and Y irrespective of the number of dimensions of the feature points. That is, if topology can be defined for feature points, these algorithms can be applied. For example, they can be applied to a similarity level determination of a gene arrangement or the like.

Further, when the present invention is combined with a visual-odometry technique in which a locus of a camera movement is detected from camera images, navigation that uses only camera images can be provided. This is because according to the present invention, a current position (place) can be estimated only from camera images without using an existing current position (place) detection technique such as the GPS. For example, the present invention can be applied to navigation in a robot or a smartphone equipped with a camera that moves or is located indoors or in a place where a GPS signal cannot be substantially received.

Although the present invention is described as a hardware configuration in the above-described exemplary embodiments, the present invention is not limited to the hardware configurations. That is, arbitrary processes can also be implemented by causing a CPU (Central Processing Unit) to execute a computer program. In such cases, the computer program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

This application is based upon and claims the benefit of priority from Japanese patent applications No. 2012-244540, filed on Nov. 6, 2012, the disclosure of which is incorporated herein in its entirety by reference.

REFERENCE SIGNS LIST

10 PLACE ESTIMATION APPARATUS
11 FEATURE VALUE EXTRACTION UNIT
12 COMMON DICTIONARY
13 MATCHING UNIT
14 SIMILARITY-LEVEL CALCULATION UNIT
15 PLACE RECOGNITION UNIT
21 LOCAL FEATURE VALUE EXTRACTION UNIT
22 FEATURE VALUE MATCHING UNIT
23 CORRESPONDING FEATURE VALUE SELECTION UNIT
24 POSITION-INVARIANT FEATURE VALUE EXTRACTION UNIT

The invention claimed is:

1. A place estimation apparatus comprising:
    a feature value extraction unit that extracts a position-invariant feature value from an input image;
    a matching unit that refers to a database and obtaining matching between the input image and a registered place, the database storing each registered place and its associated position-invariant feature value;
    a similarity-level calculation unit that calculates a similarity level in which a registered place near a selected registered place is included in the calculation when the matching is equal to or higher than a predetermined threshold; and
    a place recognition unit that recognizes that the input image is the registered place when the similarity level is equal to or higher than a predetermined threshold, wherein
    the feature value extraction unit comprises:
    a local feature value extraction unit that extracts a local feature value from each of input images formed from successively-shot successive images;
    a feature value matching unit that obtains matching between successive input images for the local feature value extracted by the local feature value extraction unit;
    a corresponding feature value selection unit that selects a feature value, for which the matching is obtained between the successive images by the feature value matching unit, as a corresponding feature value; and
    a position-invariant feature value extraction unit that obtains a position-invariant feature value based on the corresponding feature value, and
    the position-invariant feature value extraction unit extracts, from among the corresponding feature values, a corresponding feature value of which a change in a relative position with respect to another corresponding feature value present in the input image is equal to or less than a predetermined threshold as the position-invariant feature value;
    wherein the position-invariant feature value extraction unit repeatedly performs, for all of the corresponding feature values, processes comprising:
    defining a vector in each of the input images formed from the successive images, the vector being formed by a center of gravity of the already-extracted position-invariant feature values and one of the corresponding feature values;
    newly extracting, when a difference between the vectors formed in respective input images formed from the successive images is equal to or less than a predetermined threshold, the one of the corresponding feature values as the position-invariant feature value; and
    updating the center of gravity by a center of gravity between the center of gravity and the new position-invariant feature value.

2. The place estimation apparatus according to claim 1, wherein the position-invariant feature value extraction unit:

selects two pairs of the corresponding feature values in a random fashion, the pairs of the corresponding feature values being present in respective input images formed from the successive images and corresponding to each other;

defines a vector in each of the input images formed from the successive images, the vector being formed by two corresponding feature values; and extracts, when a difference between the vectors is equal to or less than a predetermined threshold, those corresponding feature values as first position-invariant feature values.

3. The place estimation apparatus according to claim 1, wherein the local feature value is a feature value of at least one of a SIFT (Scale Invariant Feature Transformation) or SURF (Speed Up Robustness Features).

4. The place estimation apparatus according to claim 1, wherein the position-invariant feature value extraction unit outputs a logical sum of a first position-invariant feature value and a second position-invariant feature value as the position-invariant feature value, the first position-invariant feature value being extracted from an image shot at a time t and an image shot at a time t−1, the second position-invariant feature value being extracted from the image shot at the time t and an image shot at a time t+1, the time t−1 being before the time t, the time t+1 being after the time t.

5. The place estimation apparatus according to claim 1, wherein the corresponding feature value selection unit inspects to determine whether there is an error in the matching obtained by the feature value matching unit based on a relative distance between a certain corresponding feature value and another corresponding feature value, and removes, if there is an error, an erroneously-matched corresponding feature value.

6. The place estimation apparatus according to claim 1, wherein the position-invariant feature value extraction unit extracts the position-invariant feature value by detecting an affine-invariant quantity related to the corresponding feature value.

7. A feature value extraction apparatus comprising:

local feature value extraction unit that extracts a local feature value from each of input images formed from successively-shot successive images;

feature value matching unit that obtains matching between successive input images for the local feature value extracted by the local feature value extraction unit;

corresponding feature value selection unit that selects a feature value, for which the matching is obtained between the successive images by the feature value matching unit, as a corresponding feature value; and position-invariant feature value extraction unit that obtains a position-invariant feature value based on the corresponding feature value, and the position-invariant feature value extraction unit extracts, from among the corresponding feature values, a corresponding feature value of which a change in a relative position with respect to another corresponding feature value present in the input image is equal to or less than a predetermined threshold as the position-invariant feature value;

wherein the position-invariant feature value extraction unit repeatedly performs, for all of the corresponding feature values, processes comprising:

defining a vector in each of the input images formed from the successive images, the vector being formed by a center of gravity of the already-extracted position-invariant feature values and one of the corresponding feature values;

newly extracting, when a difference between the vectors formed in respective input images formed from the successive images is equal to or less than a predetermined threshold, the one of the corresponding feature values as the position-invariant feature value; and updating the center of gravity by a center of gravity between the center of gravity and the new position-invariant feature value.

8. The feature value extraction apparatus according to claim 7, wherein the position-invariant feature value extraction unit:

selects two pairs of the corresponding feature values in a random fashion, the pairs of the corresponding feature values being present in respective input images formed from the successive images and corresponding to each other;

defines a vector in each of the input images formed from the successive images, the vector being formed by two corresponding feature values; and extracts, when a difference between the vectors is equal to or less than a predetermined threshold, those corresponding feature values as first position-invariant feature values.

9. The feature value extraction apparatus according to claim 7, wherein the local feature value is a feature value of at least one of a SIFT (Scale Invariant Feature Transformation) or SURF (Speed Up Robustness Features).

10. The feature value extraction apparatus according to claim 7, wherein the position-invariant feature value extraction unit outputs a logical sum of a first position-invariant feature value and a second position-invariant feature value as the position-invariant feature value, the first position-invariant feature value being extracted from an image shot at a time t and an image shot at a time t−1, the second position-invariant feature value being extracted from the image shot at the time t and an image shot at a time t+1, the time t−1 being before the time t, the time t+1 being after the time t.

11. The feature value extraction apparatus according to claim 7, wherein the corresponding feature value selection unit inspects to determine whether there is an error in the matching obtained by the feature value matching unit based on a relative distance between a certain corresponding feature value and another corresponding feature value, and removes, if there is an error, an erroneously-matched corresponding feature value.

12. The feature value extraction apparatus according to claim 7, wherein the position-invariant feature value extraction unit extracts the position-invariant feature value by detecting an affine-invariant quantity related to the corresponding feature value.

* * * * *